United States Patent [19]

Swin, Sr.

[11] 4,047,692
[45] Sept. 13, 1977

[54] APPARATUS FOR MOLDING DYNAMICALLY BALANCED FANS

[76] Inventor: Richard E. Swin, Sr., 5302 Howard, Western Springs, Ill. 60558

[21] Appl. No.: 616,387

[22] Filed: Sept. 24, 1975

[51] Int. Cl.² .................... B28B 7/02; B28B 7/16
[52] U.S. Cl. .................................. 249/142; 249/155
[58] Field of Search ............... 249/142, 151, 152, 155, 249/158, 180, 140, 102, 103, 104, 156

[56] References Cited

U.S. PATENT DOCUMENTS

| 881,912 | 3/1908 | Emrick | 249/155 |
|---|---|---|---|
| 1,533,830 | 4/1925 | Cochran | 249/155 |
| 1,586,352 | 5/1926 | Cochran | 249/155 |
| 2,442,022 | 5/1948 | Schulz | 249/155 |
| 3,136,001 | 6/1964 | Gelbard | 249/142 |
| 3,596,869 | 8/1971 | Humphrey | 249/155 |
| 3,756,553 | 9/1973 | Ranz | 249/142 |

Primary Examiner—Francis S. Husar
Assistant Examiner—John S. Brown
Attorney, Agent, or Firm—August E. Roehrig, Jr.

[57] ABSTRACT

A method of and apparatus for the manufacture of dynamically balanced molded plastic air movement devices wherein material may be readily added or deleted from inactive surface portions of the air movement devices during manufacture by adjustable pins accessable from the front or face of a mold half.

8 Claims, 5 Drawing Figures

U.S. Patent Sept. 13, 1977 4,047,692
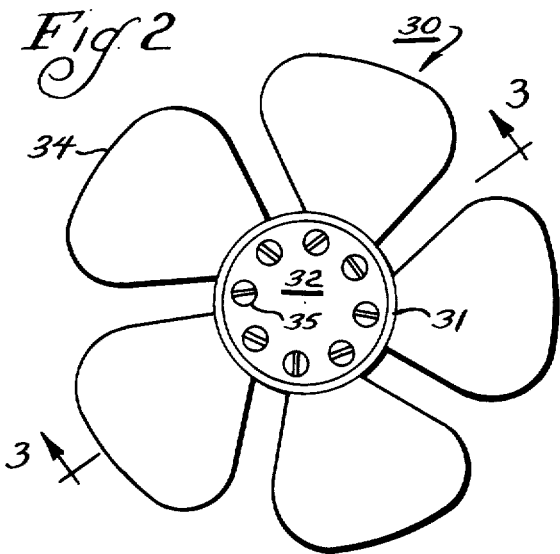
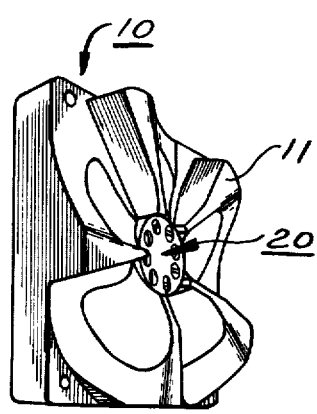
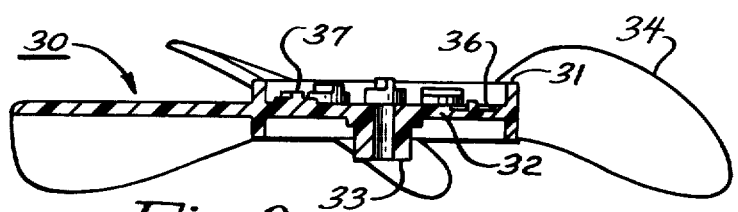
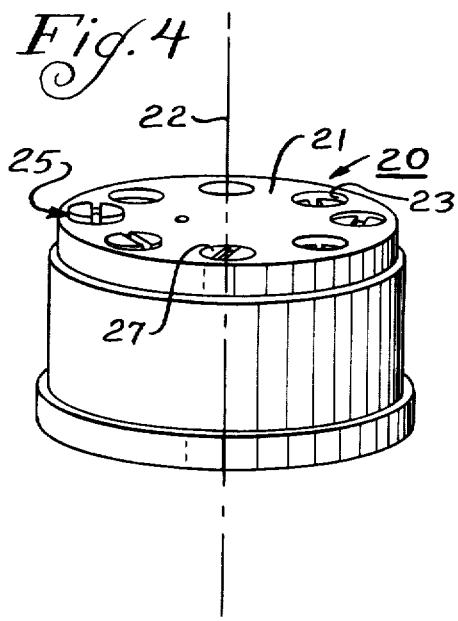
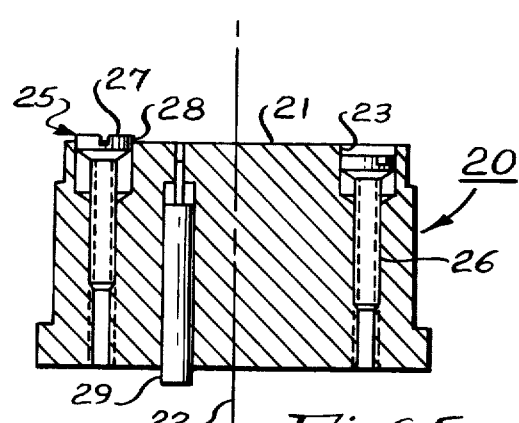

APPARATUS FOR MOLDING DYNAMICALLY BALANCED FANS

BACKGROUND OF THE INVENTION

This invention relates in general to the manufacture of plastic air movement devices and, in particular, to the manufacture of molded plastic fans of both the impeller and centrifugal or blower type.

More specifically, this invention relates to the manufacture of dynamically balanced molded plastic fans which may be balanced during manufacture through selective distribution of the plastic material within the mold.

Molded plastic air movement devices such as plastic fans are widely utilized due to lower material and manufacturing costs. These fans have found use in many varied applications such as hand-held dryers, humidifiers, and vehicle air-conditioning systems. Such fans may be sized less than one inch in diameter to in excess of 18 inches, and are used for applications requiring a wide range of rotational speed. Usually these fans are utilized within a size-rotational speed relationship such that the fan must be dynamically balanced to within very accurate limits to minimize noise or prevent failure of the unit.

Since these air movement devices are usually manufactured by an injection molding process, it has been the manufacturer's practice to mold a test fan blade in the mold cavity then test the dynamic balance of the fan blade so produced. Upon determining whether or not the blade is unbalanced, and the locus of this imbalance corrective steps are taken. The usual method to balance the subsequently produced fans has involved machining away material from predetermined areas of the mold surface to increase the weight at these locations by allowing additional plastic to be added to obtain the desired balanced weight distribution. While this method has been satisfactory to obtain balanced fans it is expensive requiring a considerable amount of machining and polishing of the mold cavity. In addition, due to changes in the density of the plastic material the mold must frequently be removed from the machine and corrective grinding to the mold surfaces effected to continuously produce dynamically balanced air movement devices. Such down time of the molding machines is extremely expensive and, therefore, this method of obtaining balanced fans has not been completely satisfactory.

In order to eliminate the problems created by grinding of the mold surface, one attempt to provide a more convenient method for manufacturing dynamically balanced molded plastic fans is described in R. B. Gelbard, U.S. Pat. No. 3,136,001 "MOLD FOR MOLDING DYNAMICALLY BALANCED FANS". This invention provides a distinct advantage over the previous method of manufacturing dynamically balanced molded plastic fans through grinding the mold surface, by providing an adjustable method of varying the quantity of material at predetermined areas of the air movement device. This prior art discloses that a dynamically balanced fan can be produced by selectively adjusting the amount of material at predetermined areas of the mold cavity through adjustable plugs.

While the invention of U.S. Pat. No. 3,136,001 greatly improves the ease of manufacturing dynamically balanced air movement devices, in many instances due to the configuration of the molds used in injection molding and various inserts carried by the mold halves, it is undesirable to adjust or vary the plugs used to effect balance of the unit from the back side of the molds. Such adjustment requires that the mold and/or core inserts must be removed from the molding machine, taking the machine out of production and, therefore, is not entirely satisfactory.

SUMMARY OF THE INVENTION

It is, therefore, an object of this invention to improve the manufacture of dynamically balanced molded plastic air movement devices.

It is another object of this invention to improve the manufacture of dynamically balanced molded plastic air movement devices by facilitating variation of the amount of plastic material utilized in manufacturing the air movement device at predetermined positions.

It is a further object of this invention to facilitate changing the quantity of plastic material added or removed from preselected inactive surface portions of the plastic air movement device during manufacture to obtain dynamic balance.

These and other objects are obtained in accordance with the present invention wherein there is provided a method of and apparatus for the manufacture of dynamically balanced molded plastic air movement devices wherein material may be readily added or deleted from inactive surface portions of the air movement devices during manufacture by adjustable pins accessable from the front or face of a mold half.

DESCRIPTION OF THE DRAWINGS

Further objects of this invention together with additional features contributing thereto and advantages accruing therefrom will become more apparent from the following description of one embodiment of the invention when read in conjunction with the accompanying drawings wherein:

FIG. 1 is a frontal perspective view of the front or face side of one mold half showing an insert carried in the mold half;

FIG. 2 is a frontal, planar view of a plastic air movement device manufactured in accordance with the present invention;

FIG. 3 is a sectional view of the plastic air movement device shown in FIG. 2 taking along lines 3—3 to better illustrate the dynamic balancing plugs formed on an inactive surface of the air movement device;

FIG. 4 is a frontal perspective view of the insert shown in the mold half of FIG. 1 to better illustrate the manner in which the adjustable plugs are varied to form the dynamic balancing pads on the air movement device; and FIG. 5 is a cross sectional view of the core insert of FIG. 4 to better illustrate the manner in which the dynamic balance pads are formed and the adjustment of the plugs carried by the insert.

DESCRIPTION OF A PREFERRED EMBODIMENT

Referring now to FIG. 1 there is shown the front or face of a mold half 10 having portions 11 extending outwardly therefrom in the configuration of one side of a fan such that upon engagement with another mold half (not shown) having on its face a complimentary surface in the configuration of the opposing side of the fan, a mold cavity will be defined by these mold halves.

The center of the mold half 10 carries an insert 20 which is utilized to form the hub of an air movement device 30 (such as that illustrated in FIGS. 2 and 3). The insert 20 is secured in the mold half 10 from the back or reverse side and during the injection molding process functions to form the hub, web and spindle, 31, 32, and 33, respectively, from which the blades 34 extend. The insert 20 carries a plurality of adjustable plugs 35 which function to vary the amount of plastic material at this locus during injection molding in a manner and for a purpose to be hereinafter described in detail.

As is well known in conventional injection molding techniques employing cooperating mold halves, the two complimentary faces of the molds form the front and rear surface of the fan created when the plastic material is injected into the mold during the molding or manufacture process. After the plastic material has been injected into the cavity defined between the two mold halves, these mold halves are parted along a parting line and the molded plastic fan removed.

Since these fans are most frequently used in applications where they must be in dynamic balance, the insert 20 carries the plurality of adjustable plugs 25, which are movable in a direction substantially perpendicular to the face 21 of the insert for forming balancing pads 35 in the web 32 of the fan (FIGS. 2 and 3). The positioning of the plugs 25 circumferentially about the center axis 22 of the insert 20 results in these balancing pads 35 being formed on the hub web 32 which is an aerodynamically inactive portion of the air movement device.

As best shown in FIGS. 4 and 5, the insert 20 carries the plurality of circumferentially spaced adjustable plugs 25 which are adjustable relative to the face 21 of the insert, such that the plugs may be moved into the insert to leave a depression extending beneath the face or may be moved outwardly from the face surface to form a depression in the molded plastic air movement device. These adjustable plugs permit the quantity of material at these locations to be varied in accordance with the requirements for effecting dynamic balancing of the fan unit. For example, if it is shown during testing that opposite blades are unbalanced additional weight is added to the lighter of the two blades by slightly withdrawing a plug into the recess in that part of the insert adjacent the lighter weight blade or, alternatively, the heavier blade may be decreased in weight by extending the plug out from the adjacent recess. Where the unbalance is relatively large both adjustments can be made.

The insert 20 is formed with smooth wall recesses 23 into which each of the adjustable plugs may be retracted. The plugs are formed with a threaded portion 26 such that rotation or turning of the plug will move the head portion 27 inwardly or outwardly relative to the face surface in accordance with the direction of the rotation. In this manner a plug 25 may be turned to be elevated above the face surface 21 (as shown on the left side of FIG. 5) or may be turned beneath the surface as shown on the right side of the same figure. In this manner the quantity of plastic material which is molded on the web at this locus will be varied. For example, the result of a plug 25 extending above the face surface 21 will form a depression 36 in the web 32 joining the spindle 33 with the hub 31 (as shown in FIG. 3) while retracting a plug 25 inwardly beneath the face surface will result in an outward extension or additional material being placed on the web 32 as shown by the balancing pad 37. The shoulder portion 28 of the plugs 25 are smoothly machined and are of a size to correspond in diameter with the smooth walls of the recess 23 formed in the insert such that the plug may be movable within the recesses without any substantial quantity of plastic material passing between the plug and walls of the recess into the threads 26 of the adjustable portion. In order to adjust the plugs in the threaded insert the head portion 27 formed with a slot for the insertion of a tool, such as a screwdriver, to adjust the plug during the molding operation.

Upon completion of the injection molding process the mold halves are opened and an injector pin 29 (shown in FIG. 5) is moved outwardly from the face of the insert to separate the fan from the mold. The molded plastic fan, upon completion of the injection molding process, has a plurality of balancing pads circumferentially spaced about the axis of rotation of the fan blade at a predetermined radius with the amount of pad being determined by the movable plugs in the insert 20. These balance pads extend outwardly (37) or inwardly (36) from the web supporting the hub in the predetermined amount required to effect dynamic balance of the fan blade. While the blades 34 supported from the hub 31 are of any typical or well known configuration and the use of a web 32 extending between the center axis or spindle 33 and the hub 31 is also well known, the placement of the pads about the hub surface in this manner achieves dynamic balance of the air movement device in the aerodynamically inactive area of the blade without effecting the air flow characteristics or adding additional weight to the blades 34.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that this invention not be limited to the particular embodiments disclosed as being the best mode contemplated for carrying out this invention, but that the invention will include all embodiments falling with the scope of the appended claims.

I claim:

1. In a mold for molding dynamically balanced plastic air movement devices comprising mold halves having complementary surfaces forming a mold cavity in the configuration of an air movement device, the improvement comprising
an insert supported in one of said mold halves for forming a portion of an air movement device, said insert having a plurality of adjustable plugs each movable into and out from the mold cavity for forming a balancing pad on said air movement device at a predetermined position to effect the dynamic balance of said air movement device.

2. The apparatus of claim 1 wherein said insert forms an aerodynamically inactive portion of the air movement device.

3. The apparatus of claim 1 wherein said insert forms a portion of the cavity defining the hub of the air movement device and the balancing pads are formed on the hub.

4. The apparatus of claim 3 wherein said adjustable plugs are spaced circumferentially about the center axis of said insert.

5. The apparatus of claim 1 wherein said adjustable plugs are selectively retractable within said insert.

6. The apparatus of claim 5 wherein said adjustable plugs are retractable within said insert from that portion of a mold half having a complementary mold cavity forming surface thereon, and further include means for rotating said plugs to effect retraction.

7. In a mold for molding dynamically balanced plastic air movement devices comprising mold halves having complimentary surfaces forming a mold cavity in the configuration of an air movement device, the improvement comprising a plurality of adjustable plugs supported in one of the mold halves and defining a balancing pad forming portion of the mold cavity, each of said adjustable plugs having means for effecting movement of the plug relative to the remaining portion of the cavity forming surface actuable from said cavity forming surface to form dynamic balancing pads on an air movement device formed therein.

8. The apparatus of claim 7, wherein said adjustable plugs are supported in said mold half at a position corresponding to an aerodynamically inactive portion of an air movement device formed within said cavity.

* * * * *